United States Patent
Kachline et al.

(10) Patent No.: US 7,854,615 B1
(45) Date of Patent: Dec. 21, 2010

(54) ROTATIONAL CONNECTOR FOR WELDING TORCH

(75) Inventors: Jeffrey L Kachline, Highland Heights, OH (US); Franklin S Mayse, Lakewood, OH (US)

(73) Assignee: Lincoln Global, Inc., City of Industry, CA (US)

( * ) Notice: Subject to any disclaimer, the term of this patent is extended or adjusted under 35 U.S.C. 154(b) by 0 days.

(21) Appl. No.: 12/771,781

(22) Filed: Apr. 30, 2010

(51) Int. Cl.
*H01R 39/00* (2006.01)
(52) U.S. Cl. ............... 439/13; 174/15.7; 213/130
(58) Field of Classification Search ............ 439/13, 439/293–295, 289, 271; 174/15.7, 15.6
See application file for complete search history.

(56) References Cited

U.S. PATENT DOCUMENTS

| | | | | |
|---|---|---|---|---|
| 3,408,610 | A |   | 10/1968 | Clarkson |
| 4,336,974 | A |   | 6/1982 | Wilson |
| 4,549,068 | A | * | 10/1985 | Kensrue ............... 219/137.63 |
| 4,687,899 | A | * | 8/1987 | Acheson ............... 219/76.14 |
| 4,892,990 | A | * | 1/1990 | Acheson ............... 219/76.14 |
| 5,338,917 | A | * | 8/1994 | Stuart et al. ........... 219/137.63 |
| 5,616,887 | A |   | 4/1997 | Kirma |
| 5,916,465 | A | * | 6/1999 | New et al. ............. 219/138 |
| 6,712,618 | B2 | * | 3/2004 | Welch .................. 439/13 |
| 6,840,787 | B2 | * | 1/2005 | Adachi et al. ........... 439/164 |
| 2008/0146064 | A1 | * | 6/2008 | Bankstahl ............. 439/332 |
| 2008/0188093 | A1 | * | 8/2008 | Jaeger ................ 439/13 |

FOREIGN PATENT DOCUMENTS

| | | |
|---|---|---|
| DE | 4406042 | 8/1994 |
| EP | 0089625 | 3/1983 |
| GB | 1403225 | 8/1975 |

OTHER PUBLICATIONS

Tough Gun Thruarm Series, MIG Gun for OTC AX-V4 Series ARC Welding Robots brochure.

* cited by examiner

*Primary Examiner*—T C Patel
*Assistant Examiner*—Harshad C Patel
(74) *Attorney, Agent, or Firm*—Benesch, Friedlander, Coplan & Aronoff, LLP

(57) ABSTRACT

A rotational connector for connecting a welding power cable to a welding torch may include an enclosure, an end cap, a torch stud, a cable stud, and a biasing member. The enclosure may have an internal surface. The end cap may have an end cap biasing surface. The end cap operably connects to the enclosure. The torch stud may include a flange that has a contact surface and a biasing surface. The cable stud may include a flange that has a contact surface and a retention surface. The cable stud retention surface may have a shape corresponding to the enclosure internal surface. The biasing member may be disposed between the end cap biasing surface and the torch stud biasing surface urging the torch stud contact surface into engagement with the cable stud contact surface and urging the cable stud retention surface into engagement with the enclosure internal surface.

20 Claims, 2 Drawing Sheets

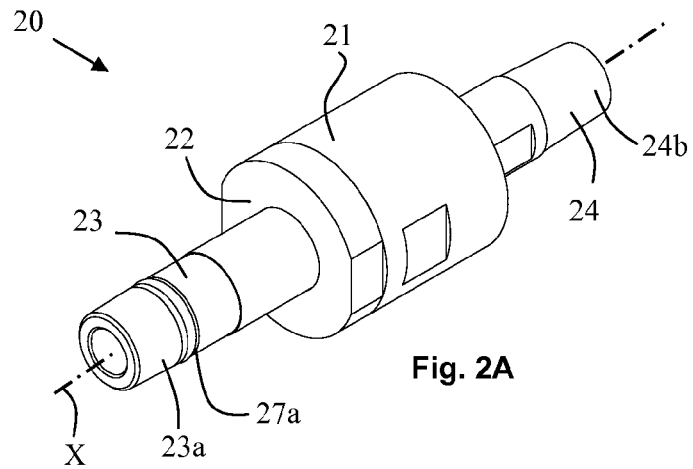
Fig. 2A
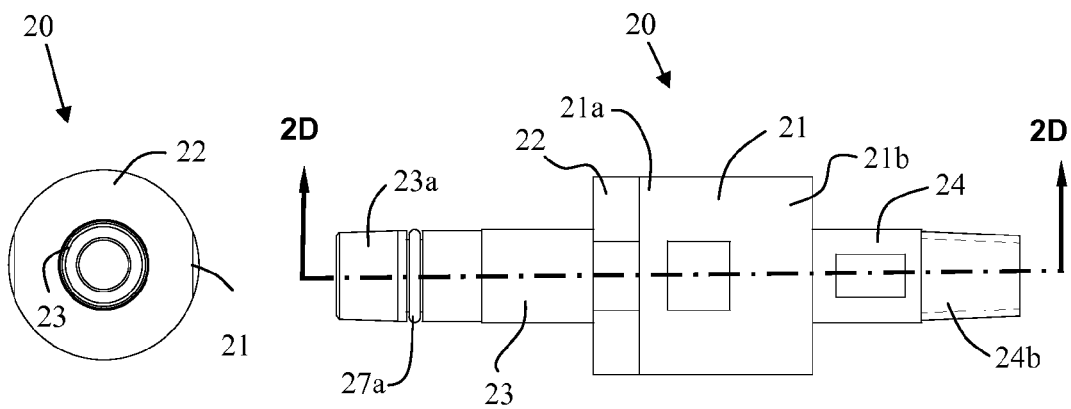
Fig. 2B
Fig. 2C
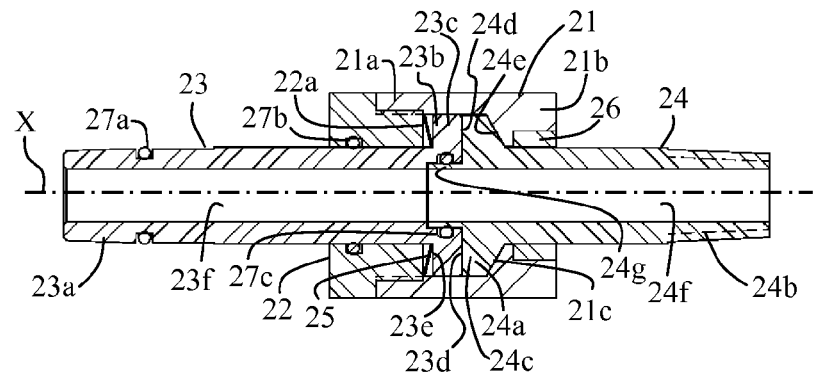
Fig. 2D

ROTATIONAL CONNECTOR FOR WELDING TORCH

FIELD OF INVENTION

The present disclosure relates generally to the field of Gas Metal Arc Welding (GMAW) or metal inert gas (MIG) welding. More particularly, the present disclosure relates to a rotational connection between a welding torch used in MIG welding and a cable that supplies the welding torch electrical current, electrode metal wire, and inert gas.

BACKGROUND

A MIG welding torch allows a user or robot to direct an electrode metal wire, an inert gas, and welding current toward a target workpiece. The electrode metal wire, the inert gas, and the welding current are fed to the welding torch via a cable. The cable and the welding torch are connected. Connection between the cable and the welding torch transmits the electrode metal wire, the inert gas, and the welding current from the cable to the welding torch.

During the welding process, rotational forces are applied to the connection between the cable and the welding torch. These forces may cause fatigue in the joint and eventually break non rotational connections. Known rotational connections may also wear out and become damaged with extended use.

SUMMARY

A rotational connector for connecting a welding power cable to a welding torch may include an enclosure, an end cap, a torch stud, a cable stud, and a biasing member. The enclosure may have an internal surface. The end cap may have an end cap biasing surface. The end cap operably connects to the enclosure. The torch stud may include a flange that has a contact surface and a biasing surface. The cable stud may include a flange that has a contact surface and a retention surface. The cable stud retention surface may have a shape corresponding to the enclosure internal surface. The biasing member may be disposed between the end cap biasing surface and the torch stud biasing surface urging the torch stud contact surface into engagement with the cable stud contact surface and urging the cable stud retention surface into engagement with the enclosure internal surface.

BRIEF DESCRIPTION OF THE DRAWINGS

In the accompanying drawings, structures are illustrated that, together with the detailed description provided below, describe exemplary embodiments of the claimed invention.

In the drawings and description that follows, like elements are identified with the same reference numerals. The drawings are not to scale and the proportion of certain elements may be exaggerated for the purpose of illustration.

FIG. 2A illustrates a perspective view of a rotational connector.

FIG. 2B illustrates a front view of the rotational connector.

FIG. 2C illustrates a side view of the rotational connector.

FIG. 2D illustrates a sectional view of the rotational connector.

DETAILED DESCRIPTION

Figure 1:
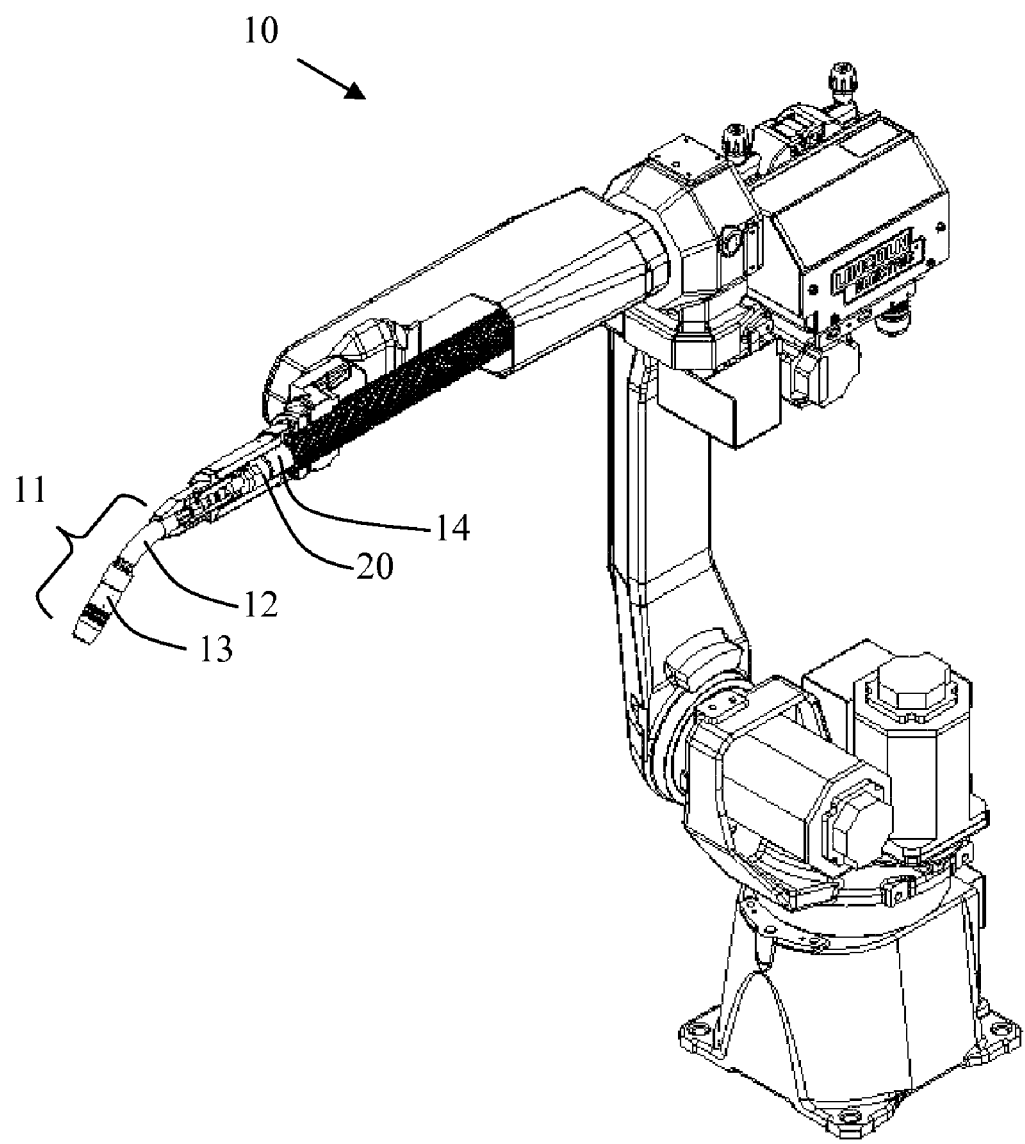
FIG. 1 illustrates a perspective view of a robot arm assembly.

FIG. 1 illustrates a perspective view of a robot arm assembly 10. Robot arm assembly 10 includes a welding torch 11, such as a metal inert gas (MIG) torch or similar. The welding torch 11 includes a gooseneck 12 and a contact tip/diffuser assembly 13. The robot arm assembly 10 also includes a cable 14. The cable 14 may supply electrode metal wire, inert gas, and welding current to welding torch 11. The cable 14 connects to the welding torch 11 via a rotational connector 20.

FIG. 2A illustrates a perspective view of rotational connector 20. FIG. 2B illustrates a front view of rotational connector 20. FIG. 2C illustrates a side view of rotational connector 20. FIG. 2D illustrates a sectional view of rotational connector 20 taken upon a plane as illustrated in FIG. 2C.

With reference to FIGS. 2A-D, rotational connector 20 includes an enclosure 21 having a longitudinal axis X. The longitudinal axis X may be defined as the axis along the longest dimension of the rotational connector 20, and is not necessarily the axis along the longest dimension of the enclosure 21. Enclosure 21 has an enclosure torch end 21a, and an enclosure cable end 21b located opposite the enclosure torch end 21a along the longitudinal axis X. Enclosure 21 further has an enclosure internal surface 21c disposed in the interior of enclosure 21. In the illustrated embodiment, the enclosure internal surface 21c has a tapered or frusto-conical surface. In alternative embodiments, the enclosure internal surface may have surfaces other than tapered or frusto-conical.

Rotational connector 20 further includes an end cap 22. The end cap 22 has an end cap biasing surface 22a. End cap 22 operably connects to the enclosure 21 at or near the enclosure torch end 21a. The operable connection between the enclosure 21 and the end cap 22 may be a fixed connection or a releasable connection. In the illustrated embodiment, the connection between the enclosure 21 and the end cap 22 is a threaded connection.

Rotational connector 20 further includes a torch stud 23. In the illustrated embodiment, torch stud 23 is coaxial with enclosure 21 and therefore shares the same longitudinal axis X. Torch stud 23 has a torch stud torch end 23a and a torch stud rotational connection end 23b opposite the torch stud torch end 23a along the longitudinal axis X. When rotational connector 20 is assembled, the torch stud torch end 23a extends from the enclosure torch end 21a, while the torch stud rotational connection end 23b is disposed within the enclosure 21. The torch stud rotational connection end 23b includes a torch stud flange 23c that has a torch stud contact surface 23d and a torch stud biasing surface 23e. Torch stud 23 further has a torch stud interior surface forming a torch stud bore 23f.

Rotational connector 20 further includes a cable stud 24. In the illustrated embodiment, cable stud 24 is coaxial with enclosure 21 and therefore shares the same longitudinal axis X. Cable stud 24 has a cable stud rotational connection end 24a and a cable stud cable end 24b opposite the cable stud rotational connection end 24a along the longitudinal axis X. When rotational connector 20 is assembled, the cable stud cable end 24b extends from the enclosure cable end 21b while the cable stud rotational connection end 24a is disposed within the enclosure 21. The cable stud rotational connection end 24a includes a cable stud flange 24c that has a cable stud contact surface 24d and a cable stud retention surface 24e. Cable stud retention surface 24e has a shape corresponding to the enclosure internal surface 21c. In the illustrated embodiment where the enclosure internal surface 21c has a tapered or frusto-conical surface, cable stud retention surface 24e has a corresponding tapered or frusto-conical surface. Cable stud 24 further has a cable stud interior surface forming a cable stud bore 24f.

When rotational connector 20 is assembled, the torch stud bore 23f together with the cable stud bore 24f form an extended bore along the longitudinal axis X in rotational connector 20. Inert gas may flow and electrode metal wire may be fed through this bore in rotational connector 20.

In the illustrated embodiment, the cable stud rotational connection end 24a has a cylindrical lip 24g disposed along the longitudinal axis X adjacent to the cable stud contact surface 24d. In the embodiment, when rotational connector 20 is assembled, at least a portion of the cylindrical lip 24g is located within the torch stud bore 23f.

Rotational connector 20 further includes a biasing member 25 disposed between the end cap biasing surface 22a and the torch stud biasing surface 23e. The biasing member 25 may be one or a combination of various known biasing members in the art (e.g. a spring, a washer, a spring washer, a Belleville washer, a wave spring, a spiral spring, and so on). In one particular embodiment, the biasing member 25 is a single wave spring. When rotational connector 20 is assembled, the biasing member 25 urges the torch stud contact surface 23d into engagement with the cable stud contact surface 24d. The torch stud 23 and the cable stud 24 are in electrical contact at least at the engagement of the torch stud contact surface 23d and the cable stud contact surface 24d. The biasing member 25 also urges the cable stud retention surface 24e into engagement with the enclosure internal surface 21c.

The torch stud 23 is configured to operably connect to a welding torch (e.g. torch 11 in FIG. 1) and the cable stud 24 is configured to operably connect to a cable (e.g. cable 14 in FIG. 1). When rotational connector 20 is assembled, electrical current and shielding inert gas may flow and an electrode wire may be fed through rotational connector 20 while the welding torch and the cable are free to rotate relative to each other.

Rotational connector 20 further includes a bearing 26 (e.g. rolling element bearing, ball bearing, and so on) disposed around the cable stud 24 between the cable stud 24 and the enclosure 21. In one embodiment, bearing 26 may be impregnated in a lubricant (e.g. oil, grease, and so on).

Rotational connector 20 further includes one or more sealing members 27a-c, such as O-rings. In the illustrated embodiment, the sealing member 27c, for example, is disposed between the cylindrical lip 24g and the torch stud bore 23f.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components. An "operable connection," or a connection by which entities are "operably connected," is one by which the operably connected entities or the operable connection perform its intended purpose. For example, two entities may be operably connected to each other directly or through one or more intermediate entities.

While example systems, methods, and so on, have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A rotational connector for connecting a welding power cable to a welding torch, the rotational connector comprising:
    an enclosure having a longitudinal axis, an enclosure torch end, an enclosure cable end opposite the enclosure torch end along the longitudinal axis, and an enclosure interior frusto-conical surface disposed in the interior of the enclosure;
    an end cap operably connected to the enclosure substantially at the enclosure torch end, where the end cap has an end cap biasing surface;
    a torch stud having a torch stud torch end and a torch stud rotational connection end opposite the torch stud torch end along the longitudinal axis, where the torch stud torch end extends from the enclosure torch end and the torch stud rotational connection end is disposed within the enclosure, where the torch stud rotational connection end includes a torch stud flange having a torch stud contact surface and a torch stud biasing surface, where the torch stud has a torch stud interior surface defining a torch stud bore;
    a cable stud having a cable stud rotational connection end and a cable stud cable end opposite the cable stud rotational connection end along the longitudinal axis, where the cable stud cable end extends from the enclosure cable end and the cable stud rotational connection end is disposed within the enclosure, where the cable stud rotational connection end includes a cable stud flange having a cable stud contact surface and a cable stud frusto-conical surface with a shape corresponding to the enclosure interior frusto-conical surface, and where the cable stud rotational connection end has a cylindrical lip disposed along the longitudinal axis adjacent to the cable stud contact surface, and where at least a portion of the cylindrical lip is disposed within the torch stud bore;
    a bearing disposed around the cable stud between the cable stud and the enclosure; and
    a spring disposed between the end cap biasing surface and the torch stud biasing surface urging the torch stud contact surface into engagement with the cable stud contact surface and urging the cable stud frusto-conical surface into engagement with the enclosure interior frusto-conical surface.

2. The rotational connector of claim 1, where the bearing is impregnated in oil.

3. The rotational connector of claim 1, further comprising at least one o-ring disposed between the cylindrical lip and the torch stud interior surface forming the torch stud bore.

4. The rotational connector of claim 1, where the spring is a single wave spring.

5. The rotational connector of claim 1, where the torch stud and the cable stud are in electrical contact at least at the engagement of the torch stud contact surface and the cable stud contact surface.

6. The rotational connector of claim 1, where the torch stud is configured to operably connect to the welding torch and the cable stud is configured to operably connect to the welding power cable such that electrical current and shielding gas may flow from the welding power cable to the welding torch while the welding power cable is free to rotate relative to the welding torch.

7. A rotational connector for connecting a welding power cable to a welding torch, the rotational connector comprising:
   an enclosure having a longitudinal axis, an enclosure torch end, an enclosure cable end opposite the enclosure torch end along the longitudinal axis, and an enclosure internal surface;
   an end cap operably connected to the enclosure substantially at the enclosure torch end, where the end cap has an end cap biasing surface;
   a torch stud having a torch stud torch end and a torch stud rotational connector end opposite the torch stud torch end along the longitudinal axis, where the torch stud torch end is configured to extend from the enclosure torch end and the torch stud rotational connector end is configured to be disposed within the enclosure, and where the torch stud rotational connection end includes a torch stud flange having a torch stud contact surface and a torch stud biasing surface;
   a cable stud having a cable stud rotational connector end and a cable stud cable end opposite the cable stud rotational connector end along the longitudinal axis, where the cable stud cable end is configured to extend from the enclosure cable end and the cable stud rotational connector end is configured to be disposed within the enclosure, and where the cable stud rotational connector end includes a cable stud flange having a cable stud contact surface and a cable stud retention surface, where the cable stud retention surface has a shape corresponding to the enclosure internal surface; and
   a biasing member disposed between the end cap biasing surface and the torch stud biasing surface urging the torch stud contact surface into engagement with the cable stud contact surface and urging the cable stud retention surface into engagement with the enclosure internal surface.

8. The rotational connector of claim 7 further comprising a bearing disposed around the cable stud between the cable stud and the enclosure.

9. The rotational connector of claim 8 where the bearing is impregnated in oil.

10. The rotational connector of claim 7, where the torch stud has an interior surface forming a bore, where the cable stud rotational connection end has a cylindrical lip disposed adjacent to the cable stud contact surface along the longitudinal axis, and where at least a portion of the cylindrical lip is disposed within the bore.

11. The rotational connector of claim 10, further comprising at least one sealing member disposed between the cylindrical lip and the interior surface forming the bore.

12. The rotational connector of claim 11, where the at least one sealing member is an o-ring.

13. The rotational connector of claim 7, where the biasing member is a single spring.

14. The rotational connector of claim 13, where the single spring is a wave spring.

15. The rotational connector of claim 7, where the torch stud and the cable stud are in electrical contact at least at the engagement of the torch stud contact surface and the cable stud contact surface.

16. The rotational connector of claim 7, where the torch stud and the cable stud have respective interior surfaces forming respective bores configured to transport inert gas therethrough.

17. The rotational connector of claim 7, where the torch stud is configured to operably connect to the welding torch and the cable stud is configured to operably connect to the welding power cable such that electrical current and inert gas flows through the rotational connector to the welding torch while the welding torch is free to rotate relative to the welding power cable.

18. A rotational connector for connecting a welding power cable to a welding torch, the rotational connection comprising:
   an enclosure having a longitudinal axis, an enclosure torch end, an enclosure cable end opposite the enclosure torch end along the longitudinal axis, and an enclosure interior tapered surface;
   a torch stud having a torch stud torch end and a torch stud rotational connection end opposite the torch stud torch end along the longitudinal axis, where the torch stud torch end extends from the enclosure torch end and the torch stud rotational connection end is disposed within the enclosure, and where the torch stud rotational connection end includes a torch stud flange having a torch stud contact surface and a torch stud biasing surface;
   a cable stud having a cable stud rotational connection end and a cable stud cable end opposite the cable stud rotational connection end along the longitudinal axis, where the cable stud cable end extends from the enclosure cable end and the cable stud rotational connection end is disposed within the enclosure, and where the cable stud rotational connection end includes a cable stud flange having a cable stud contact surface and a cable stud tapered surface substantially corresponding to the enclosure interior tapered surface; and
   means for biasing the torch stud contact surface into engagement with the cable stud contact surface and for biasing the cable stud tapered surface into engagement with the enclosure interior tapered surface.

19. The rotational connector of claim 18, further comprising an end cap operably connected to the enclosure substantially at the enclosure torch end, where the end cap has an end cap biasing surface and the means for biasing are disposed between the end cap biasing surface and the torch stud biasing surface.

20. The rotational connector of claim 18, further comprising at least one sealing member disposed between the torch stud and the cable stud.

* * * * *